US006776722B2

(12) United States Patent  (10) Patent No.: US 6,776,722 B2
De-Gol  (45) Date of Patent: Aug. 17, 2004

(54) RIDE APPARATUS

(75) Inventor: Gino Daniel De-Gol, Perton (GB)

(73) Assignees: Robocoaster Limited, South Staffordhire (GB); Kuka Roboter GmbH, Augsburg (GE)

( * ) Notice: Subject to any disclaimer, the term of this patent is extended or adjusted under 35 U.S.C. 154(b) by 0 days.

(21) Appl. No.: 10/070,394

(22) PCT Filed: Jun. 12, 2001

(86) PCT No.: PCT/GB01/02537

§ 371 (c)(1),
(2), (4) Date: Jul. 2, 2002

(87) PCT Pub. No.: WO01/95989

PCT Pub. Date: Dec. 20, 2001

(65) Prior Publication Data

US 2002/0183123 A1 Dec. 5, 2002

(30) Foreign Application Priority Data

Jun. 16, 2000 (GB) ................................. 0015005
Oct. 20, 2000 (GB) ................................. 0025761

(51) Int. Cl.[7] ................................................ A63G 31/16
(52) U.S. Cl. ..................... 472/59; 472/60; 472/130; 434/55
(58) Field of Search ............... 472/47, 29, 59, 472/60, 61, 130; 434/29, 55

(56) References Cited

U.S. PATENT DOCUMENTS

| 870,378 | A | * | 11/1907 | Maynes | 472/47 |
|---|---|---|---|---|---|
| 4,584,896 | A | * | 4/1986 | Letovsky | 74/490.1 |
| 4,908,558 | A | | 3/1990 | Lordo et al. | |
| 5,453,011 | A | | 9/1995 | Feuer et al. | |
| 5,489,212 | A | | 2/1996 | Yoshimoto et al. | |
| 5,499,920 | A | | 3/1996 | Trumbull | |
| 5,527,184 | A | | 6/1996 | Trumbull | |
| 5,558,581 | A | * | 9/1996 | Knijpstra | 472/31 |
| 5,685,718 | A | | 11/1997 | McClintic | |
| 5,711,670 | A | | 1/1998 | Barr | |
| 5,768,122 | A | | 6/1998 | Motoc | |
| 5,791,903 | A | | 8/1998 | Feuer et al. | |
| 5,860,808 | A | | 1/1999 | Yoshimoto et al. | |
| 5,865,624 | A | * | 2/1999 | Hayashigawa | 434/66 |
| 6,079,982 | A | * | 6/2000 | Meader | 434/29 |

FOREIGN PATENT DOCUMENTS

| DE | 296 17 332 | 5/1997 |
|---|---|---|
| DE | 199 00 442 | 7/2000 |
| DE | 199 00 528 | 9/2000 |
| EP | 0 997 175 | 5/2000 |
| EP | 0 997 176 | 5/2000 |
| GB | 2 295 098 | 5/1996 |
| JP | 05158399 | 6/1993 |
| WO | WO 94/19783 | 9/1994 |
| WO | WO 94/29828 | 12/1994 |
| WO | WO 97/15363 | 5/1997 |
| WO | WO 00/28505 | 5/2000 |

* cited by examiner

*Primary Examiner*—Kien Nguyen
(74) *Attorney, Agent, or Firm*—McGlew and Tuttle, P.C.

(57) ABSTRACT

An amusement ride includes an output member having an anthropomorphic robot arm adapted for six degrees of movement. The ride further includes a passenger station in moveable engagement with said output member, a platform, and optionally a ticket reader.

56 Claims, 12 Drawing Sheets

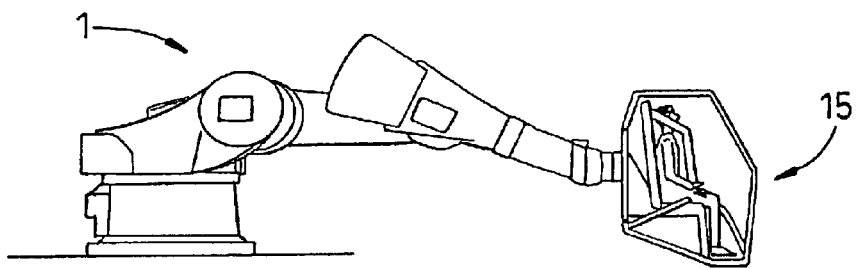
Fig. 2A
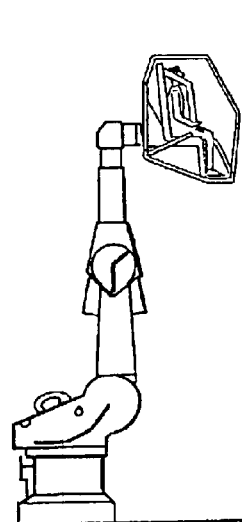 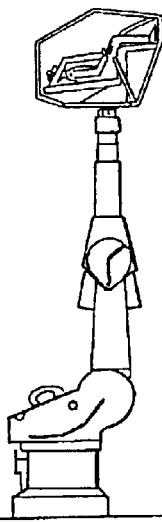 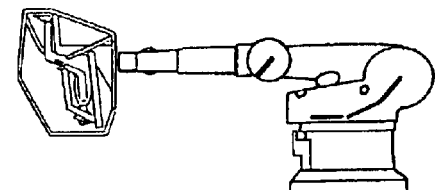
Fig. 2B  Fig. 2C  Fig. 2D
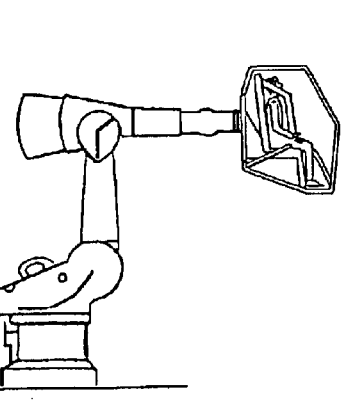 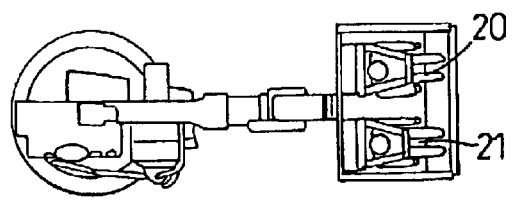
Fig. 2E  Fig. 2F

Fig. 9A  Fig. 9B

RIDE APPARATUS

FIELD OF THE INVENTION

This invention relates to ride apparatus and particularly (but not exclusively) to ride apparatus used in amusement parks and the like.

BACKGROUND OF THE INVENTION

A variety of amusement rides is known for use in amusement parks. Such rides typically comprise dodgem, log flume, roller coaster and vertical drop rides. However, these rides are commonplace and there is an increasing demand for new, novel rides to maintain interest in said parks.

SUMMARY OF THE INVENTION

Accordingly, the present invention provides an amusement ride comprising an output member having an anthropomorphic robot arm adapted for six degrees of movement, said ride further comprising a passenger station in moveable engagement with said output member, a platform, and optionally a ticket reader.

The amusement ride is preferably supported on the ground. Alternatively, the amusement ride may be supported from a wall or from a ceiling.

More preferably, the ride may be mounted on a carousel. Alternatively, the ride may be mounted on a column The column may be provided with means to cause vertical movement of the ride along a path parallel to the axis of the column Alternatively, the ride may be mounted on a column which is in turn mounted on a carousel.

The passenger station preferably comprises one or more seats.

The passenger station preferably has means for audio-visual interaction. The audio-visual interaction may be respectively provided by speakers and a display means.

The visual and audio interaction may, separately or together, be synchronized with movements of the ride.

The audio and visual interaction data is stored on a data carrier. The data carrier may be a Mini Disc (MD), a CD-ROM, a magneto-optical device, a video tape, a hard drive, a Digital Versatile Disc (DVD) or other equivalent data carrier. The audio and visual interaction data may be stored on a combination of any two or more of the aforementioned data carriers Lighting effects may be used throughout the audio-visual interaction. The lighting effects may be synchronized with the ride. The lighting effects may comprise, for example, strobe, laser or disco light shows or any combination thereof.

The display means may be a plasma screen, a liquid crystal display, an active matrix Organic Light Emitting Diode (OLED) display, or a Light Emitting Polymer (LEP) display The visual interaction may alternatively be provided by a projector and screen The seats preferably comprise retaining means to retain a passenger when the ride is operable.

The retaining means may comprise a belt, for example, a safety belt or a pull down rigid harness or similar harness Alternatively, the retaining means may comprise a cage.

The retaining means is preferably in operative engagement with a linear actuator.

The amusement ride may further comprise a weight sensor, said weight sensor providing a means to counter out of balance loads Alternatively, the weight sensor provides a means to counter a maximum weight overload The amusement ride may further comprise a controller The controller is preferably located in the passenger station. Alternatively, the controller is located at a passenger entrance to the ride.

The controller may be used to select a pre-programmed ride. Alternatively, the controller may be used to control the amusement ride independently of the pre-programmed ride The controller is preferably a joystick Alternatively, the controller may be a steering wheel or a joypad.

The controller may further comprise one or more foot pedals

The controller may comprise a combination of the aforementioned joystick and/or steering wheel and/or joypad and/or foot pedals The ticket reader can read a ticket, said ticket preferably being compatible with said ride The ticket may be a card made of a plastics material. The ticket preferably has a code defining a pre-programmed ride The code is preferably a bar code. Alternatively, the code may be contained in a microchip incorporated in the ticket The platform preferably comprises one or more steps, with a raised platform in operative engagement with said steps. The platform, in use, may suitably be adapted for pivotal movement about a substantially horizontal axis The platform is preferably raised and lowered about its axis by means of an actuator. The actuator may be hydraulically or pneumatically operated. The platform may be raised or lowered about its axis by a combination of hydraulic or pneumatic actuators Alternatively, the platform may be fixed and the amusement ride may be adapted to be lowered to a position which allows the ingress and egress of passengers respectively on to or off from the amusement ride In a further alternative the platform may be retracted into a stowage compartment and, in use, said platform is extended from the stowage compartment to engage with the ride in a lowered position The platform may be retracted and extended by means of one or more actuators. The actuators may be hydraulically or pneumatically operated, or a combination of hydraulic and pneumatic operation The platform preferably further comprises a safety barrier. The safety barrier, in use, may suitably be adapted for pivotal movement about a substantially vertical axis Alternatively, the platform and safety barrier may each be adapted for pivotal movement about a substantially 45° axis (relative to the ground).

The safety barrier is preferably operated about its axis by means of an actuator. The actuator may be hydraulically or pneumatically operated.

The amusement ride preferably further comprises safety means. Preferably the safety means is controlled by a computer Preferably the safety means comprises actuators The actuators may be electro-mechanically, hydraulically or pneumatically operated, or a combination of electromechanical, hydraulic and pneumatic operation.

The safety means preferably limits a G-force generated by the amusement ride

The amusement ride may comprise more than one of said rides. Where two or more rides are employed they may be programmed to move synchronously. Alternatively, it may be programmed to move asynchronously Two or more rides may be used in a combat game.

The ride may be water-proofed for use in a "splash park"

The ride may comprise water cannons for use in a combat-type game in a splash park.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated

BRIEF DESCRIPTION OF THE DRAWINGS

In the drawings:

FIG. 2A is a side view of the amusement ride of FIG. 1 in an operative condition during a ride;

FIG. 2B is a side view of the amusement ride of FIG. 1 in another operative condition during a ride, FIG. 2C is a side view of the amusement ride of FIG. 1 in another operative condition during a ride, FIG. 2D is a side view of the amusement ride of FIG. 1 in another operative condition during a ride;

FIG. 2E is a side view of the amusement ride of FIG. 1 in another operative condition during a ride;

FIG. 2F is a top view of the amusement ride of FIG. 1 in another operative condition during a ride;

FIG. 9A is a side view showing the use of linear actuators or safety interlocks in the operation of a retaining means;

FIG. 9B is a side view showing the use of linear actuators or safety interlocks in the operation of a retaining means;

FIG. 12A is a side view showing the ride adapted to be incorporated into a fairground ride, such as a carousel or the like;

FIG. 12B is a side view showing the ride adapted to be incorporated into a fairground ride, such as vertical lift, or the like

DESCRIPTION OF THE PREFERRED EMBODIMENTS

Figure 1:
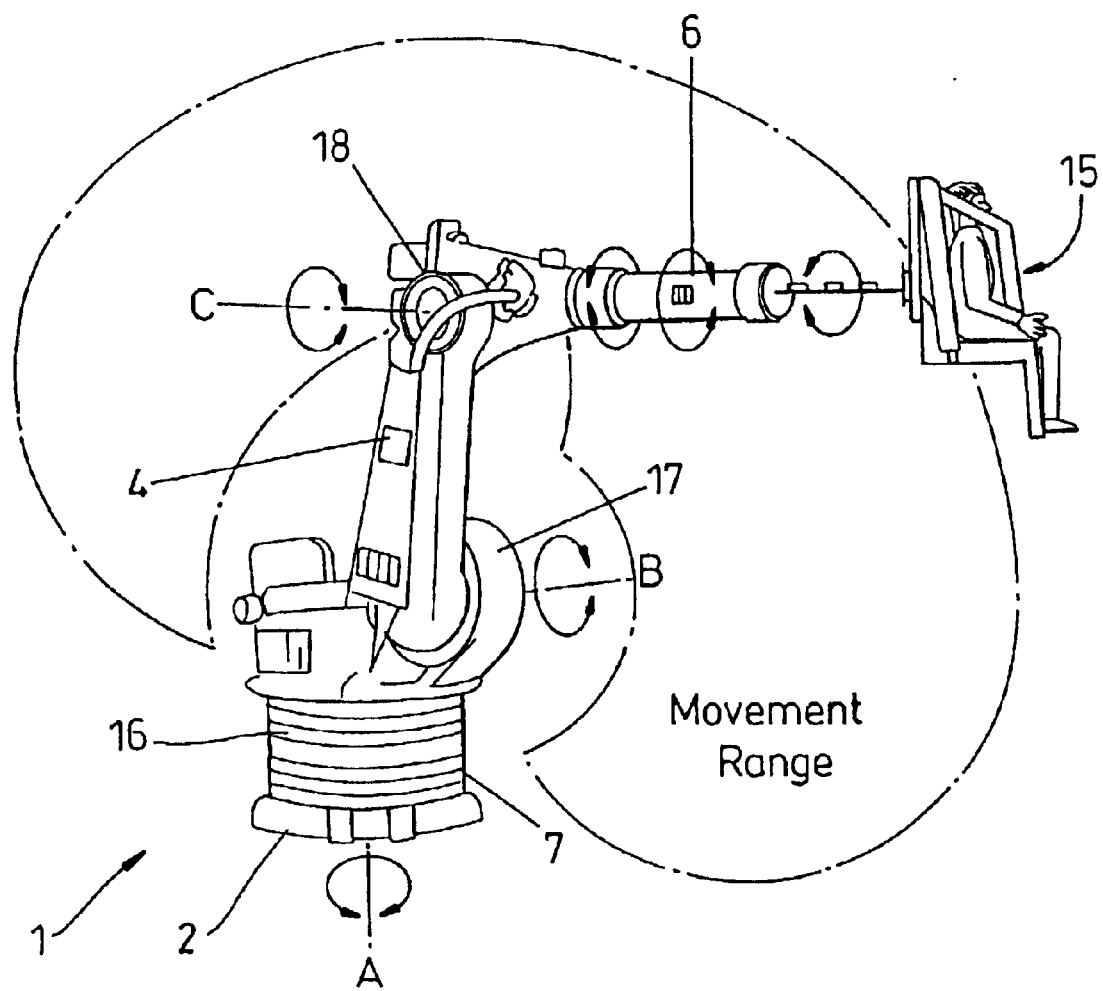
FIG. 1 is a perspective view showing an amusement ride output member in accordance with the present invention.

Referring to the drawings in particular, FIG. 1 shows an amusement ride 1 comprising a base portion 2 supported on the ground and a trunnion 7 mounted on the base portion 2 to give rotation about a substantially vertical axis A The trunnion 7 is in operative engagement with a first elongate member 4, said elongate member being adapted to move about a substantially horizontal axis B, said elongate member being in operative engagement with a second elongate member 6 adapted to move about a substantially horizontal axis C parallel to axis B. The second elongate member has a further 3 degrees of movement about the axis of said second elongate member 6 and a passenger station 15 in moveable engagement with said member The amusement ride movements about said axes are controlled by motors 16, 17 and 18

FIGS. 2A to 2F illustrate the various conditions that the amusement ride 1 of FIG. 1 may assume during a ride. The passenger station 15 is shown having two seats, 20 and 21.

Figure 3A:
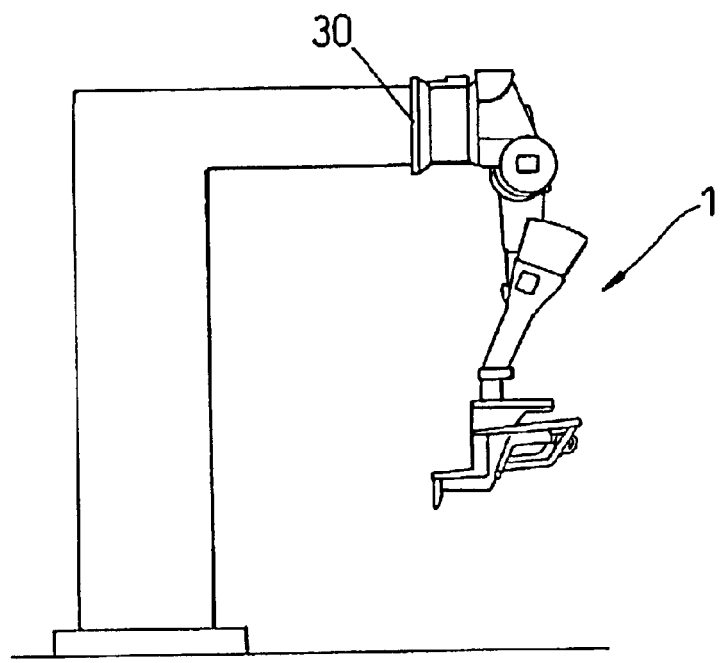
FIG. 3A is a side view of the amusement ride of FIG. 1 in an alternative mounted condition.
Figure 3B:
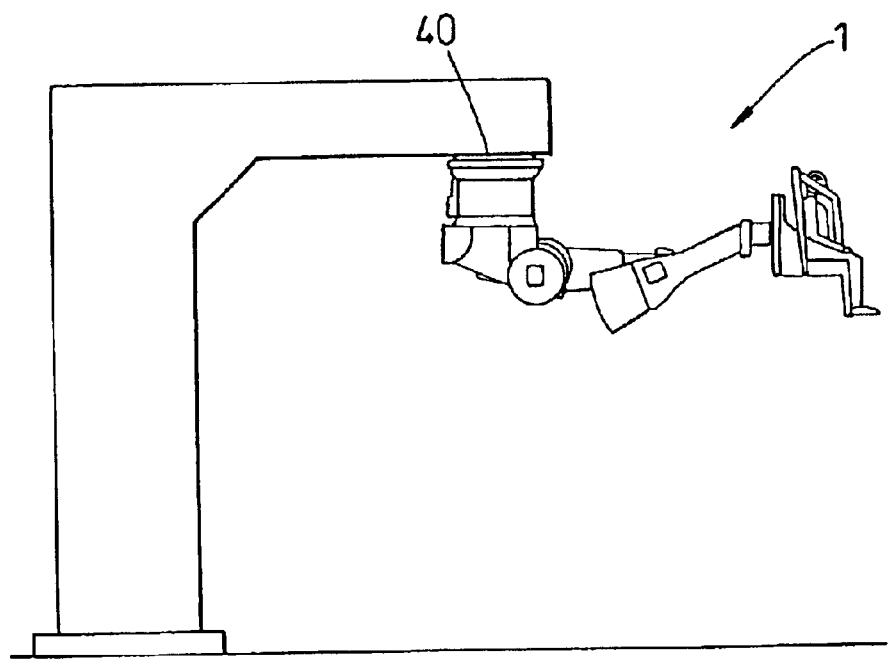
FIG. 3B is a side view of the amusement ride of FIG. 1 in another alternative mounted condition.

Referring to FIGS. 3A and 3B, alternative mountings of the amusement ride are illustrated. The ride 1 may be supported from a wall 30 or a ceiling 40. The passenger station may also be configured so that arms and legs of a passenger are unsupported.

Figure 4:
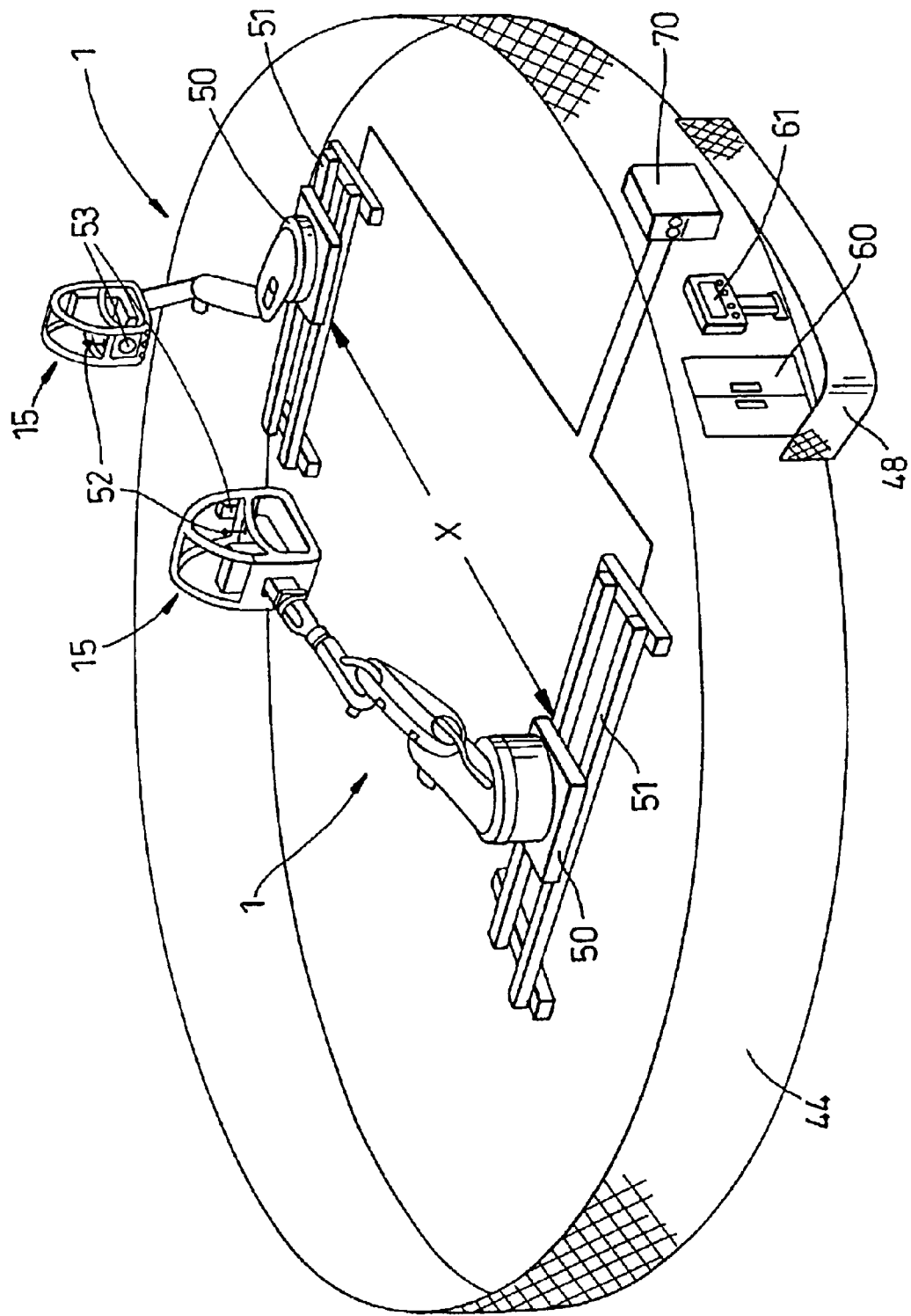
FIG. 4 is a perspective view showing two amusement rides of FIG. 1 in a combat game.

FIG. 4 shows two amusement rides 1 in use in a combat game. The two rides are diametrically opposed to each other at a predetermined distance X. Said rides are each mounted on a fixed base or (as shown) on a base 50 in sliding engagement with a rail track 51, the bases and the tracks being parallel with each other. The passenger stations 15 are provided with a controller 52 and with optical (e g. infra-red, photoelectric or laser) emitter and receiver assemblies 53, enabling the said passenger stations 15 to interact with each other In a splash park, the optical emitter and receiver assemblies may be substituted with one or more water cannons.

Figure 5A:
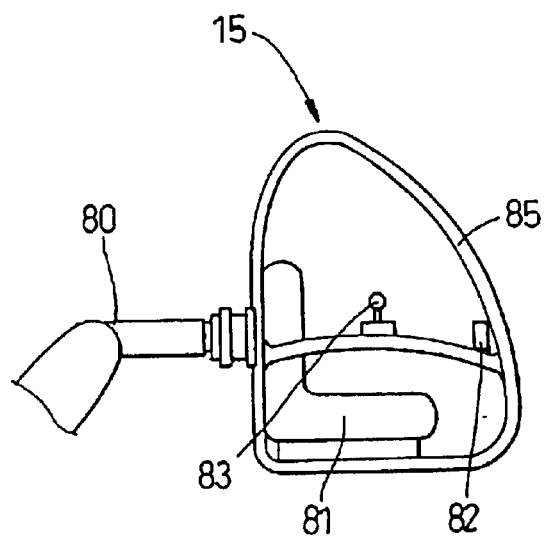
FIG. 5A is a side view showing a passenger station in accordance with the present invention.
Figure 5B:
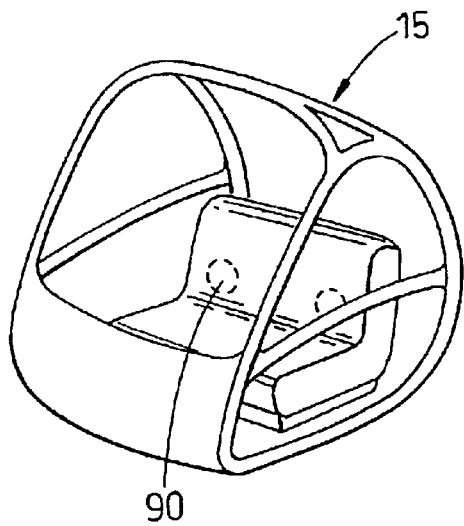
FIG. 5B is a perspective view showing a passenger station in accordance with the present invention.

The ride is enclosed by a reticulated fence 44 having a closure 60 (for ingress and egress of passengers) and a ticket machine 61 located adjacent the closure 60, for passengers to buy tickets for said ride The combat game is controlled by a computer 70 The computer 70 is integrated with the ticket machine 61 and with the two rides FIGS. 5A and 5B show the passenger station 15. The passenger station 15 is in movable engagement with the output member 80 of the ride. The passenger station 15 comprises a seat 81 with a weight sensor 90 located in the seat 81, a joystick controller 83 and a display means 82.

Figure 5C:
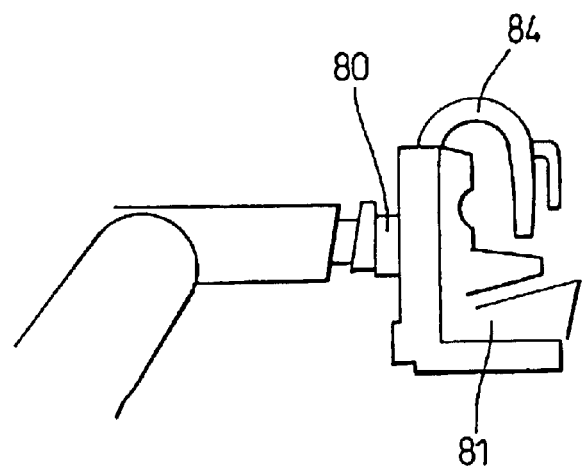
FIG. 5C is a side view showing a passenger station in accordance with the present invention.

FIG. 5C shows a passenger station 15 fitted with a pull down safety harness 84 The seat 81 is not contained in a capsule 85 (see FIG. 5A)

Figure 6A:
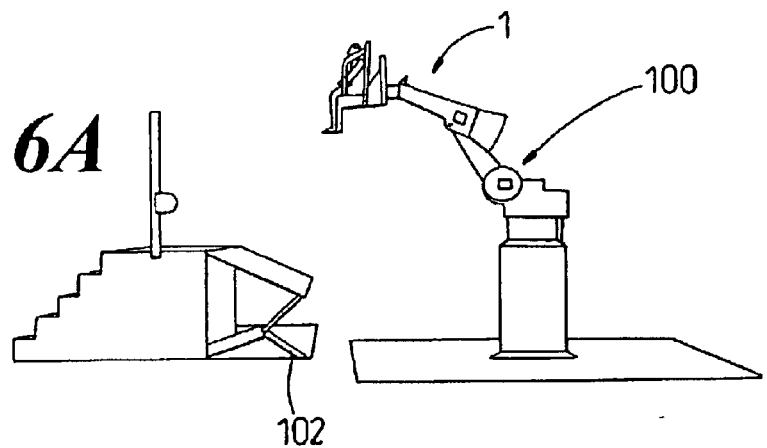
FIG. 6A is a side view showing a part of a first procedure for vacating the amusement ride.
Figure 6B:
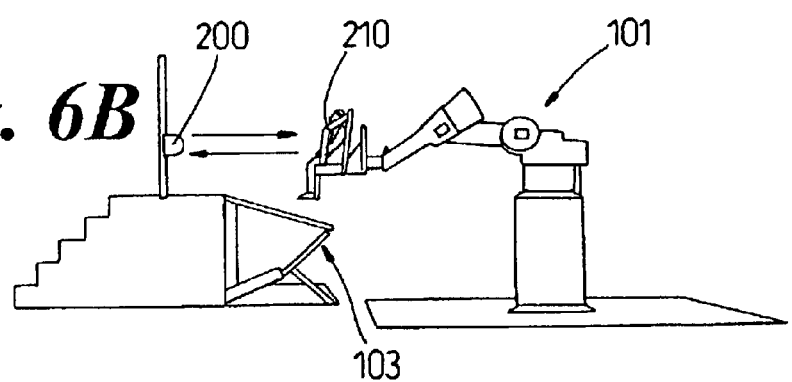
FIG. 6B is a side view showing another part of a first procedure for vacating the amusement ride.
Figure 6C:
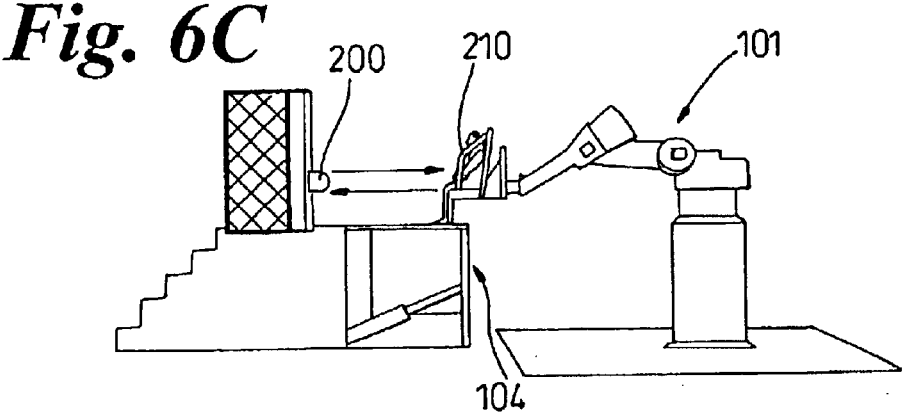
FIG. 6C is a side view showing another part of a first procedure for vacating the amusement ride.
Figure 7A:
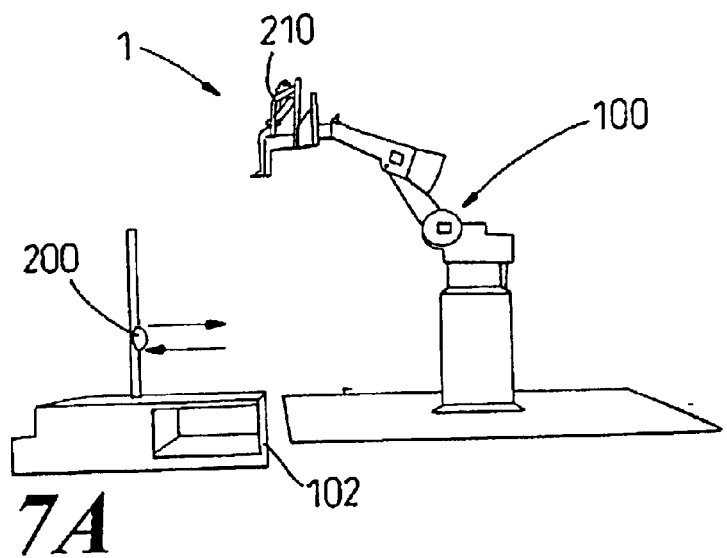
FIG. 7A is a side view showing a part of a second procedure for vacating the amusement ride.
Figure 7B:
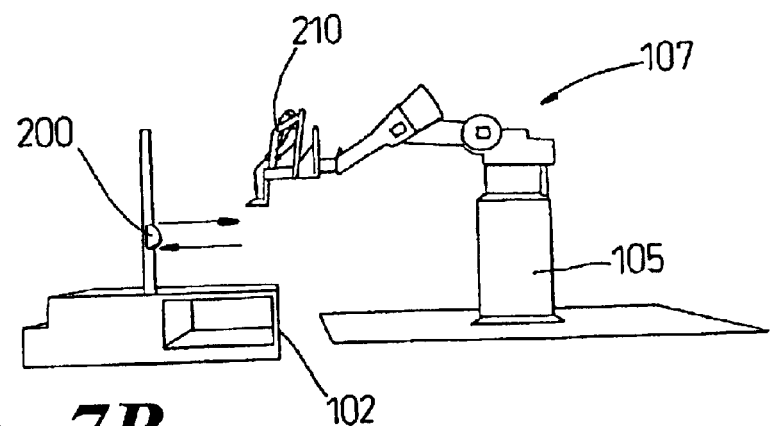
FIG. 7B is a side view showing another part of a second procedure for vacating the amusement ride.
Figure 7C:
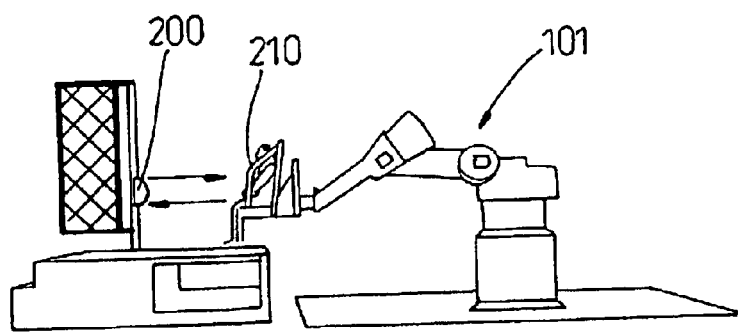
FIG. 7C is a side view showing another part of a second procedure for vacating the amusement ride.

FIGS. 6A to 6C illustrate an aligning procedure for the ride. The ride 1 is shown in a first operative condition 100, attained at the beginning or end of a ride. The robot then lowers to a second operative condition 101, where an optical emitter 200 and receiver 210 assembly, one of said emitter and receiver being located on the ride, ensure that the ride is in the correct aligned position One or more optical emitter and receiver assemblies may be used to monitor the aligned procedure. One or more optical emitter and receiver assemblies may be used to monitor a ride throughout a ride sequence. Concomitantly a platform 102, activated by hydraulics, is raised from a first operative condition 103 to a second operative condition 104 under the ride 1 (which is in a second operative condition 101). The passengers may then leave/enter the ride Alternatively, the platform 102 is fixed and the ride is located on a vertically moving pedestal 105 as shown in FIGS. 7A to 7C The ride is in a first operative condition 100, attained at the beginning or at the end of a ride. The ride then lowers to an intermediate operative condition 107 The pedestal 105 is lowered to a second operative condition 101 bringing the passenger into contact with the fixed platform 102. Again, the aforementioned optical emitter and receiver-assemblies may be used to monitor the aligning procedure. The passengers may then enter or leave the ride 1

Figure 8A:
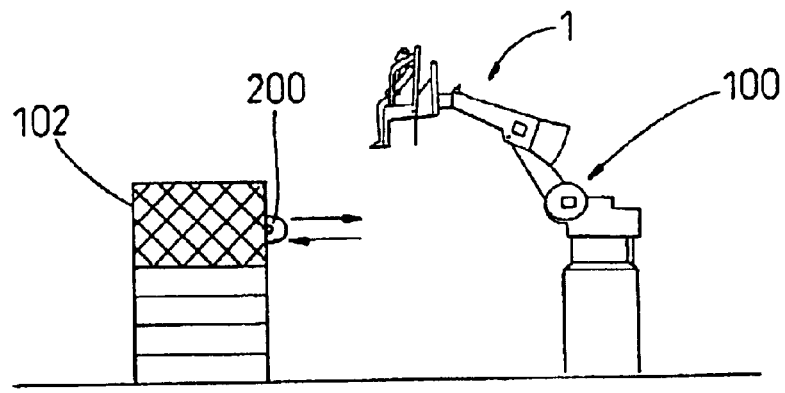
FIG. 8A is a side view showing a part of a third procedure for vacating the amusement ride.
Figure 8B:
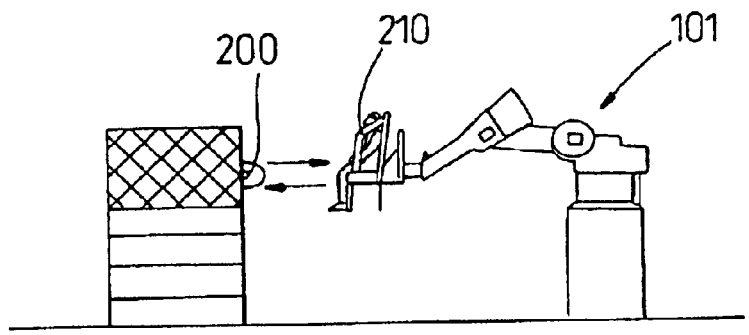
FIG. 8B is a side view showing another part of a third procedure for vacating the amusement ride.
Figure 8C:
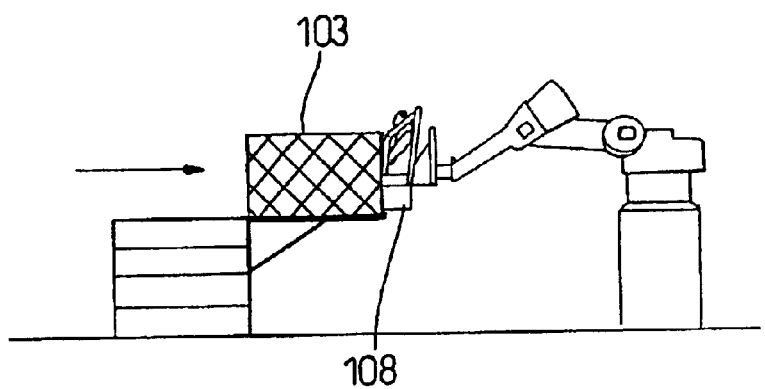
FIG. 8C is a side view showing another part of a third procedure for vacating the amusement ride.
Figure 9C:
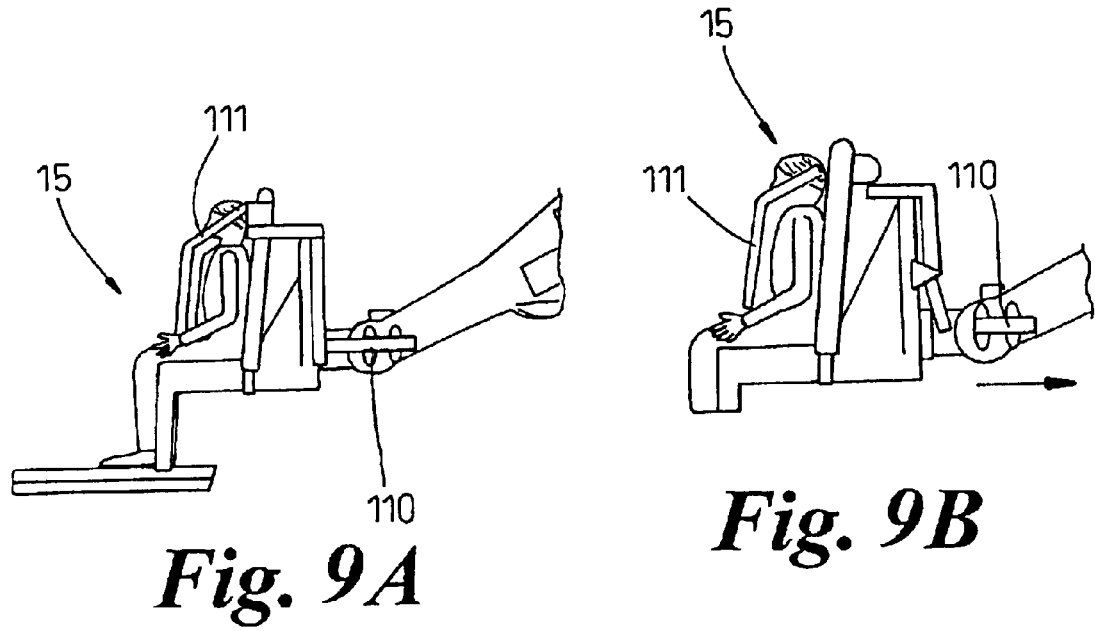
FIG. 9C is a top view showing the use of linear actuators or safety interlocks in the operation of a retaining means.
Figure 9C:
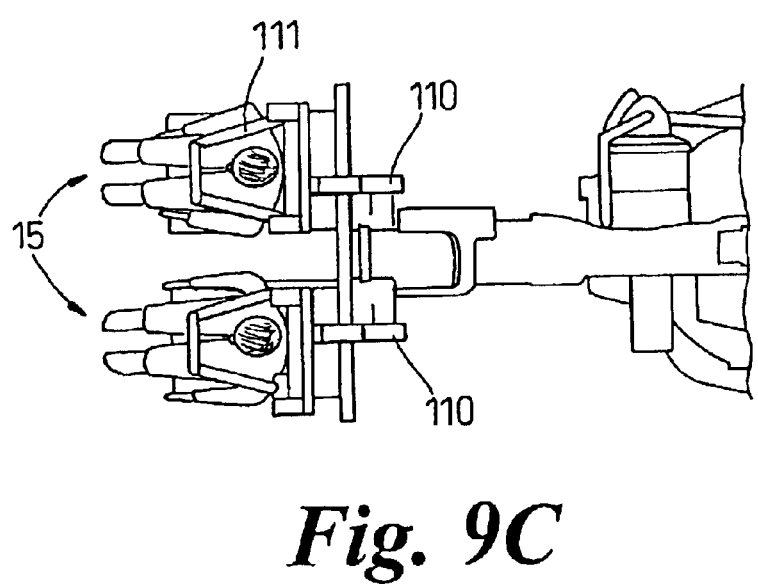
Figure 10:
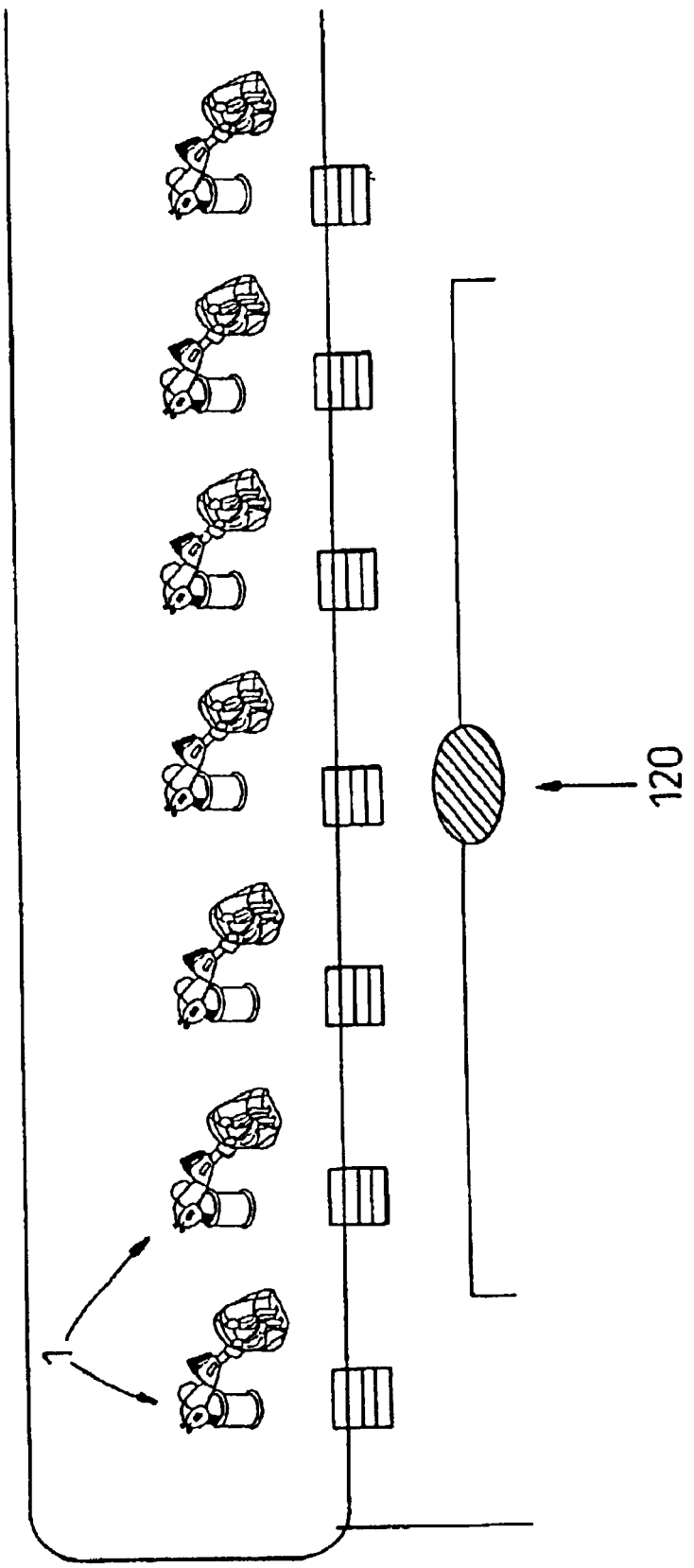
FIG. 10 is a schematic perspective view showing the ride operatively connected with other rides for synchronous movement.
Figure 11A:
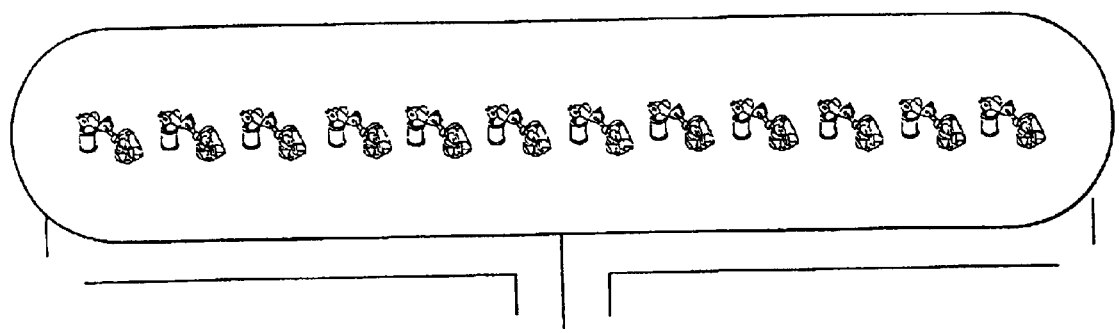
FIG. 11A is a schematic perspective view showing combinations of rides operatively connected in an arrangement.
Figure 11B:
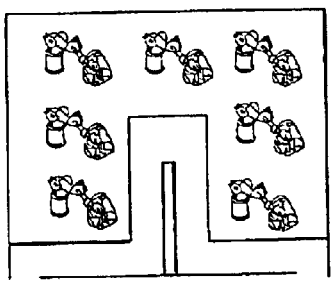
FIG. 11B is a schematic perspective view showing combinations of rides operatively connected in an alternative arrangement.
Figure 11D:
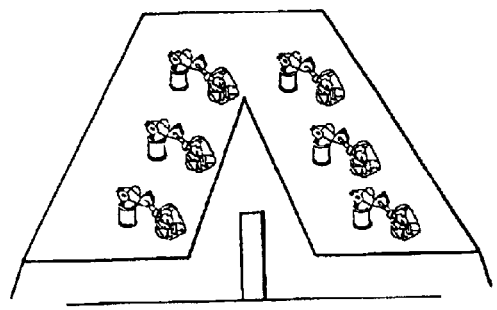
FIG. 11D is a schematic perspective view showing combinations of rides operatively connected in an alternative arrangement.
Figure 11C:
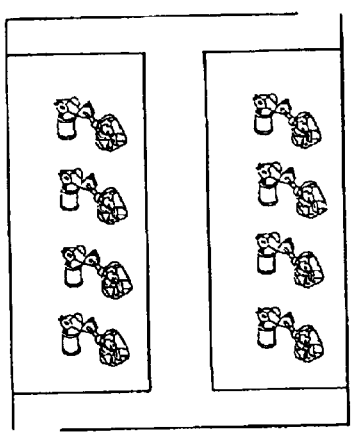
FIG. 11C is a schematic perspective view showing combinations of rides operatively connected in an alternative arrangement.
Figure 12A:
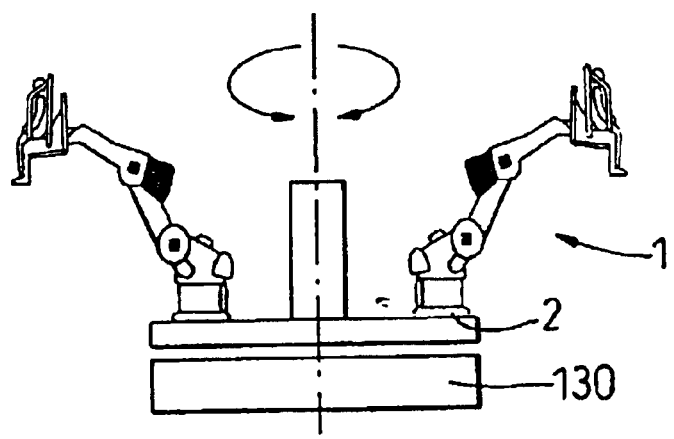
Figure 12B:
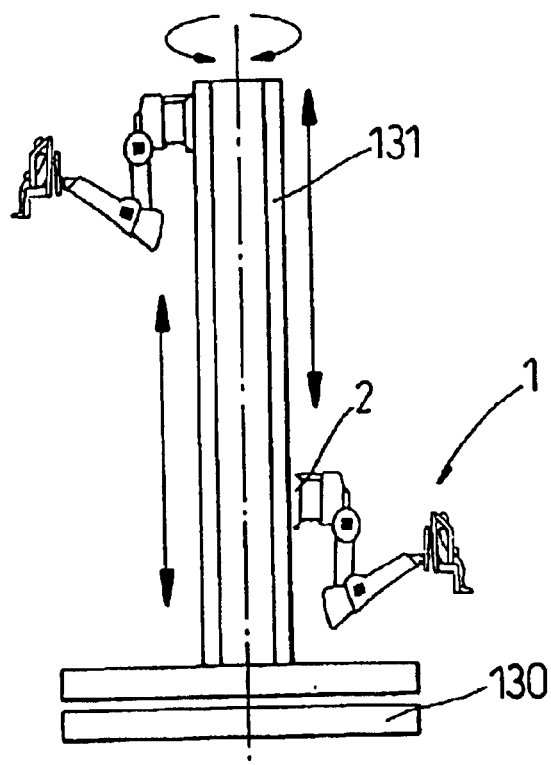

In a further alternative shown in FIGS. 8A to 8C the ride 1 is in a first operative condition 100, attained at the beginning or at the end of a ride. The robot then lowers to a second operative condition 101, where an optical emitter 200 and receiver 210 assembly, one of said emitter and receiver being located on said ride, to ensure that the ride is in the correct aligning position. One or more optical emitter and receiver assemblies may be used to monitor the aligning procedure. Concomitantly a platform 102 activated by hydraulics is extended from a first retracted condition 103 to a second operative condition 104 to engage with the ride 108. The engagement oft he platform with the ride may facilitate part of a safety check for the above aligning procedure Upon leaving the ride the retaining means (e g. a safety belt or cage) must be released FIGS. 9A to 9C illustrate the use of shot bolt actuators 110 in releasing the retaining means. The shot bolt actuators can only be activated when the ride is in the aforementioned second operative condition 101 The shot bolt actuators 110 when activated release the retaining means 111, permitting the ingress and egress of passengers One or more amusement rides 1 of the present invention may be linked by a computer so as to move synchronously. The rides are controlled by a supervisor and control station 120, as illustrated in FIG. 10. The amusement rides can also be programmed to move asynchronously to one another. The rides may also be assembled in various combinations as illustrated in FIGS. 11A to 11D The base 2 of the amusement ride 1 of the present invention can be supported on a carousel 130, as illustrated in FIG. 12A One or more of said rides can be mounted onto the carousel The carousel 130 may alternatively have an elongate centrally located column 131, from which one or more of said rides 1 may be supported, as illustrated in FIG. 12B The rides can then also rotate and move in a vertical plane simultaneously While specific embodiments of the invention have been shown and described in detail to illustrate the application of the principles of the invention, it will be understood that the invention may be embodied otherwise without departing from such principles.

What is claimed is:

1. An amusement ride comprising: an output member having an anthropomorphic robot arm with six degrees of movement; a passenger station in movable engagement with said output member; and a platform for ingress and egress of passengers, said platform at least being movable to a first storing position and to a second position for said ingress and egress of passengers.

2. An amusement ride as claimed in claim 1, further comprising a support connection to said robot arm, said support connection being connected to a wall.

3. An amusement ride as claimed in claim 1, further comprising a support connection to said robot arm, said support connection being connected to a ceiling.

4. An amusement ride as claimed in claim 1, further comprising a carousel the robot arm being mounted on said carousel.

5. An amusement ride as claimed in claim 1, further comprising a column, said robot arm being mounted on said column.

6. An amusement ride as claimed in claim 1, wherein said column is provided with means to cause vertical movement of the ride along a path parallel to an axis of the column.

7. An amusement ride, as claimed in claim 1, wherein said column is mounted on a carousel.

8. An amusement ride as claimed claim 1, wherein the passenger station has means for audio-visual interaction.

9. An amusement ride as claimed in claim 8, wherein the audiovisual interaction is synchronized with movements of the said ride.

10. An amusement ride as claimed in claim 9, wherein the audio-visual interaction is stored on a data carrier.

11. An amusement ride as claimed in claim 10, wherein the data carrier is a Mini Disc, a CD-ROM, a magneto-optical device, a video tape, a hard drive, a Digital Versatile Disc (DVD) or equivalent data carrier.

12. An amusement ride as claimed in claim 8, wherein a display means comprises a plasma screen, a liquid crystal display (LCD), an active matrix Organic Light Emitting Diode display (OLED) or a Light Emitting Polymer (LEP) display.

13. An amusement ride as claimed in claim 1, further comprising lights for providing lighting effects throughout the ride.

14. An amusement ride as claimed in claim 13, further comprising synchronizing means for synchronizing the lighting effects with the ride.

15. An amusement ride as claimed in claim 13, or claim 14, wherein the lighting effects comprise one or more of strobe, laser or disco light effects.

16. An amusement ride as claimed in claim 1, wherein the passenger station includes a seat and a retaining means for retaining a passenger relative to the seat.

17. An amusement ride as claimed in claim 16, wherein the retaining means comprises a belt or similar harness.

18. An amusement ride as claimed in claim 16, wherein the retaining means comprises a pull down harness.

19. An amusement ride as claimed in claim 16 or 17 or 18, further comprising a linear actuator wherein the retaining means is in operative engagement with the linear actuator.

20. An amusement ride as claimed in claim 1, further comprising a weight sensor.

21. An amusement ride as claimed in claim 20, wherein the weight sensor acts, in use, to counter a maximum weight overload.

22. An amusement ride as claimed in claim 1, further comprising a pre-programable controller with programing for controlling at least one run of the ride.

23. An amusement ride as claimed in claim 1, wherein a controller is used to select a pre-programmed ride.

24. An amusement ride as claimed in claim 1, wherein a controller is used to control said amusement ride independently of a pre-programmed ride.

25. An amusement ride as claimed in claim 1, further comprising a joy stick controller.

26. An amusement ride as claimed in claim 1, further comprising a steering wheel controller.

27. An amusement ride as claimed in claim 1, further comprising a joypad controller.

28. An amusement ride as claimed in claim 1, further comprising a controller including a foot pedal.

29. An amusement ride as claimed in claim 1, further comprising a controller with two or more of a joy stick, a steering wheel, a joypad and a foot pedal.

30. An amusement ride as claimed in claim 1, further comprising a ticket reader for reading a ticket, said ticket being compatible with said ride.

31. An amusement ride as claimed in claim 30, wherein a code for control is contained in a microchip incorporated in the ticket.

32. An amusement ride as claimed in claim 1, further comprising one or more steps with said platform in operative engagement with said steps.

33. An amusement ride as claimed in claim 1, further comprising a safety barrier associated with the platform.

34. An amusement ride as claimed in claim 33, wherein the safety barrier is adapted for pivotal movement about a substantially vertical axis.

35. An amusement ride as claimed in claim 33, wherein said safety barrier and said platform are each adapted for pivotal movement about a substantially 45° axis.

36. An amusement ride as claimed in claim 1, further comprising: another output member having an anthropomorphic robot arm with six degrees of movement; and another passenger station in movable engagement with said another output member.

37. An amusement ride as claimed in claim 36, wherein said another output member and said another passenger station are programmed to move synchronously with said output member and said passenger station.

38. An amusement ride as claimed in claim 36, further comprising: a further output member having an anthropomorphic robot arm with six degrees of movement; and a further passenger station in movable engagement with said further output member wherein said another output member and said another passenger station are programmed to move synchronously with said output member and said passenger station and said further output member and said further passenger station.

39. An amusement ride as claimed in claim 36, wherein said another output member and said another passenger station are linked for actuation with said output member and said passenger station to provide a combat game.

40. An amusement ride as claimed in claim 1, further comprising optical emitter and receiver assemblies to monitor an aligning procedure.

41. An amusement ride as claimed in claim 40, further comprising optical emitter and receiver assemblies to monitor said ride throughout a ride sequence.

42. An amusement ride as claimed in claim 41, wherein the optical emitter and receiver assemblies are selected from the group consisting of infra-red, photoelectric and laser emitter and receiver assemblies.

43. An amusement ride as claimed in claim 1, wherein the ride is waterproofed for use in a splash park.

44. An amusement ride as claimed in claim 1, wherein the ride is used as a combat ride with one or more water cannons.

45. An amusement ride as claimed in claim 1, further comprising safety means.

46. An amusement ride as claimed in claim 45, wherein said safety means is controlled by a computer.

47. An amusement ride as claimed in claim 45, wherein the safety means comprises actuators.

48. An amusement ride as claimed in claim 47, wherein the actuators are one or more of electro-mechanical actuators, hydraulic actuators and pneumatic actuators.

49. An amusement ride as claimed in claim 45, wherein the safety means limits a Gforce generated by the ride.

50. An amusement ride as claimed in claim 1, wherein said platform is adapted for pivotal movement about a substantially horizontal axis.

51. An amusement ride as claimed in claim 50, further comprising an actuator, wherein said platform is raised and lowered about its axis by said actuator.

52. An amusement ride as claimed in claim 51, wherein said actuator is one of a hydraulic actuator and a pneumatic actuator.

53. An amusement ride as claimed in claim 51, further comprising another actuator wherein said another actuator is a hydraulic actuator to raise and lower said platform and said actuator is a pneumatic actuator.

54. An amusement ride as claimed in claim 1, further comprising an actuator for moving said platform.

55. An amusement ride as claimed in claim 54, wherein said actuator is one of a hydraulic actuator and a pneumatic actuator.

56. An amusement ride as claimed in claim 1, further comprising a hydraulic actuator and a pneumatic actuator for moving said platform into said first and second position, respectively.

\* \* \* \* \*